US009477730B2

(12) United States Patent
Liensberger et al.

(10) Patent No.: US 9,477,730 B2
(45) Date of Patent: Oct. 25, 2016

(54) WEB SERVICES RUNTIME FOR DATASET TRANSFORMATION

(75) Inventors: Christian Liensberger, Bellevue, WA (US); Moe Khosravy, Bellevue, WA (US); Erik Meijer, Mercer Island, WA (US); Rene Bouw, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1095 days.

(21) Appl. No.: 12/914,787

(22) Filed: Oct. 28, 2010

(65) Prior Publication Data

US 2012/0109937 A1     May 3, 2012

(51) Int. Cl.
*G06F 17/30* (2006.01)
*G06Q 10/10* (2012.01)

(52) U.S. Cl.
CPC ......... *G06F 17/30569* (2013.01); *G06Q 10/10* (2013.01)

(58) Field of Classification Search
USPC ........................................................ 707/722
See application file for complete search history.

(56) References Cited

U.S. PATENT DOCUMENTS

| | | | | |
|---|---|---|---|---|
| 5,996,010 A * | 11/1999 | Leong et al. | ................ | 709/223 |
| 7,483,901 B1 | 1/2009 | Massoudi | | |
| 7,698,398 B1 | 4/2010 | Lai | | |
| 2004/0068586 A1 * | 4/2004 | Xie | ................... | G06F 17/30569 709/246 |
| 2005/0044367 A1 * | 2/2005 | Gasparini | ............. | G06F 21/121 713/172 |
| 2005/0138606 A1 * | 6/2005 | Basu | ........................ | G06F 8/74 717/136 |
| 2006/0173868 A1 * | 8/2006 | Angele et al. | ............... | 707/100 |
| 2006/0195476 A1 * | 8/2006 | Nori | .................. | G06F 17/30607 707/999.107 |
| 2007/0226196 A1 * | 9/2007 | Adya et al. | ....................... | 707/3 |
| 2007/0242302 A1 * | 10/2007 | Haller | ..................... | H04L 67/02 358/1.15 |
| 2008/0040510 A1 * | 2/2008 | Warner | ............... | G06F 17/3089 709/246 |
| 2008/0120607 A1 | 5/2008 | Dippel | | |
| 2008/0201338 A1 * | 8/2008 | Castro et al. | ................. | 707/100 |
| 2008/0288599 A1 | 11/2008 | Kutchmark | | |
| 2009/0228785 A1 | 9/2009 | Creekbaum et al. | | |
| 2009/0234804 A1 * | 9/2009 | Whitechapel et al. | ........... | 707/3 |
| 2010/0198907 A1 * | 8/2010 | Samsalovic | ............ | G01C 21/32 709/203 |
| 2012/0123924 A1 * | 5/2012 | Rose et al. | ...................... | 705/35 |

OTHER PUBLICATIONS

Mary Kirtland "The Programmable Web: Web Services Provides Building Blocks for the Microsoft.NET" Published Date: Sep. 2000, 10 pages; http://msdn.microsoft.com/en-us/magazine/cc302315(printer).aspx.

(Continued)

*Primary Examiner* — Yuk Ting Choi
(74) *Attorney, Agent, or Firm* — Henry Gabryjelski; Kate Drakos; Micky Minhas

(57) ABSTRACT

Various aspects for providing a runtime for dataset transformation are disclosed. In one aspect, data consumption requests are received. The requested data is retrieved from a web service in an arbitrary form, and subsequently transformed into a standardized result from the arbitrary form. In another aspect, a user interface is displayed to a content provider, and an input identifying a transform function selected by the content provider is received via the user interface. A transform assembly is then generated based on the input, which facilitates retrieving data from a web service in an arbitrary form, and transforming the data into a standardized result by calling the selected transform function. In yet another aspect, third party code is associated with a transform assembly. An execution of the third party code is then managed such that at least one aspect of the transform assembly is operated according to the execution.

16 Claims, 15 Drawing Sheets

(56) References Cited

OTHER PUBLICATIONS

D. Fensel, "The Web Service Modeling Framework WSMF", Published Date: Jun. 2010; 33 Pages.

Dominic Charles Parry, "CREWS: A Component-driven, Run-time Extensible Web Service Framework", Published Date: Dec. 2003; 103 Pages.

IBM, "Introducing Host Access Transformation Services", Published Date: Unknown, 17 Pages, http://publib.boulder.ibm.com/infocenter/hatshelp/v70/topic/com.ibm.hats.doc/doc/gsintro . . . .

* cited by examiner

WEB SERVICES RUNTIME FOR DATASET TRANSFORMATION

TECHNICAL FIELD

The subject disclosure relates to a runtime transformation of arbitrary web services data in connection with providing information as a service.

BACKGROUND

By way of background concerning some conventional systems, computing devices have traditionally stored information and associated applications and data services locally to the device. Yet, with the evolution of on-line and cloud services, information is increasingly being moved to network providers who perform none, some or all of service on behalf of devices. The evolution of network storage farms capable of storing terabytes of data (with potential for petabytes, exabytes, etc. of data in the future) has created an opportunity to mimic the local scenario in a cloud, with separation of the primary device and the external storage.

However, no cloud service or network storage provider has been able to effectively provide information as a service on any platform, with publishers, developers, and consumers easily publishing, specializing applications for and consuming any kind of data, in a way that can be tracked and audited for all involved. In addition, due to the disparate number of content providers and their typically proprietary schemas for defining data, today, where disparate content providers do not coordinate their publishing acts to the cloud with one another, there is little opportunity to leverage the collective power of such disparate publishing acts.

Content providers who choose to store their data via web services may be reluctant to move their data elsewhere. In order to provide such data for consumption, it would thus be desirable to integrate web services into an infrastructure that facilitates information as a service. To this end, it is noted that data sets stored in relational databases generally exhibit a consistency and uniformity that allows them to be queried and exposed in a uniform manner. Data sets stored in web services, however, lack consistency and uniformity, which makes efficiently exposing such data particularly challenging. Accordingly, it would thus be desirable to provide a mechanism for integrating arbitrary data originating from web services into an infrastructure that facilitates information as a service.

The above-described deficiencies of today's devices and data services are merely intended to provide an overview of some of the problems of conventional systems, and are not intended to be exhaustive. Other problems with the state of the art and corresponding benefits of some of the various non-limiting embodiments may become further apparent upon review of the following detailed description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In accordance with one or more embodiments and corresponding disclosure, various non-limiting aspects are described in connection with providing information as a service from any platform. In one such aspect, a method that facilitates providing a runtime for dataset transformation is disclosed. The method can include receiving a request directed to consumption of data associated with a content provider. Here, it is contemplated that the data can be stored in at least one database. The embodiment can further include retrieving the data from a web service in an arbitrary form, as well as transforming the data into a standardized result from the arbitrary form.

In another aspect, a method for generating a transform assembly to facilitate a runtime dataset transformation is disclosed. A user interface is displayed to a content provider, and an input from the content provider is received via the user interface. Here, the content provider is associated with consumable data stored in at least one database, and the input identifies at least one transform function selected by the content provider. The method can further include generating a transform assembly based on the input. For this embodiment, the transform assembly retrieves the data from a web service in an arbitrary form, and also transforms the data into a standardized result by calling the at least one transform function.

In yet another aspect, a method for executing third party code to facilitate a runtime dataset transformation is disclosed. This embodiment includes associating a third party code with a transform assembly. Here, the transform assembly retrieves data from a web service in an arbitrary form, and also transforms the data into a common intermediate format. The method further includes managing an execution of the third party code, and operating at least one aspect of the transform assembly according to the execution.

Other embodiments and various non-limiting examples, scenarios and implementations are described in more detail below.

BRIEF DESCRIPTION OF THE DRAWINGS

Various non-limiting embodiments are further described with reference to the accompanying drawings in which.

DETAILED DESCRIPTION

Overview

Various aspects are disclosed which automatically integrate web services and transformation functions into an infrastructure that facilitates information as a service. As discussed in the background, it is desirable to expose arbitrary data sets, originating from both databases and web services. To this end, it is noted that data sets stored in relational databases generally exhibit a consistency and uniformity that allows them to be queried and exposed in a uniform manner. Data sets stored in web services, however, lack consistency and uniformity, which makes efficiently exposing such data particularly challenging.

The various embodiments disclosed herein are directed towards resolving the lack of consistency and uniformity in web services, which allows web services to be substantially treated like a relational store, with some graceful degradation based on the support particular web services may offer. For instance, in an aspect, a web services transformation runtime is disclosed, which creates an application environment whereby content providers can provide an assembly that transforms the current behavior of their web service into behavior compliant with providing information as a service. Moreover, depending on its current behavior, it is contemplated that a web service's behavior may be augmented, and/or that a level of compliancy and desired graceful degradation of the behavior can be captured. By isolating transformation code and capturing transformation metadata, the runtime is able to provide any of a plurality of services. For example, in a particular embodiment, the runtime is configured to provide a pipeline of multiple transformations which connect to a billing infrastructure. Embodiments are also disclosed which facilitate developing custom transformations.

Web Services Runtime

Figure 1:
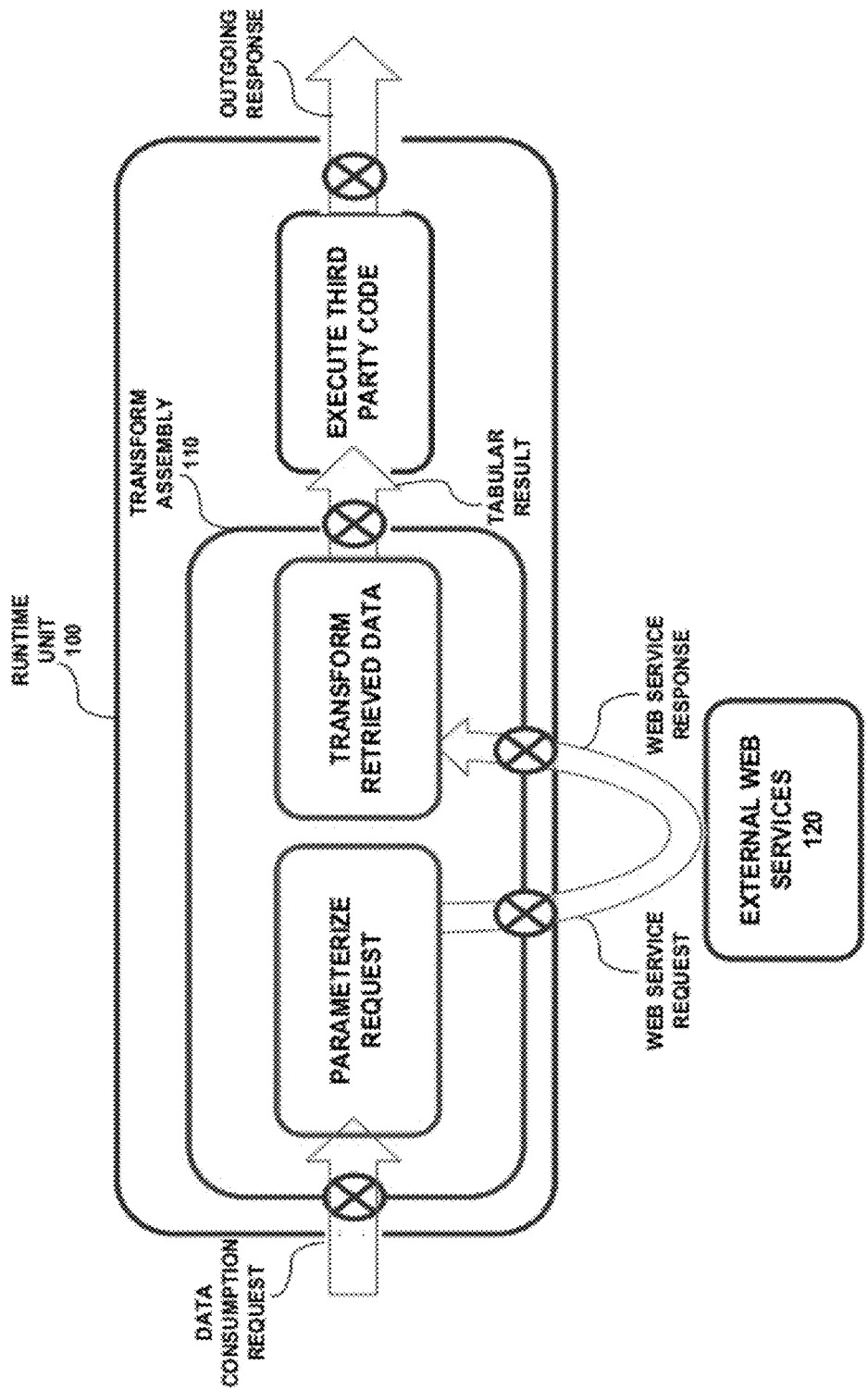
FIG. 1 illustrates an exemplary system that facilitates providing a runtime for dataset transformation according to an embodiment.

FIG. 1 illustrates an exemplary system that facilitates providing a runtime for dataset transformation according to an embodiment. As illustrated, such a system can include runtime unit 100, which is communicatively coupled to external web services 120. Within such embodiment, it is contemplated that requests for a content provider's data hosted by external web services 120 are processed by runtime unit 100. In a particular aspect, runtime unit 100 includes transformation assembly 110, which is uploaded by a content provider and facilitates such processing. For instance, upon receiving a data consumption request, it is contemplated that transformation assembly 110 will provide external web services 120 with a parameterized version of the request. Moreover, transform assembly 110 can be configured to ascertain input parameters which map to the particular web service hosting the requested data. To this end, it should be noted that data retrieved from external web services 130 can be received by transform assembly 110 in any of a plurality of forms. Accordingly, in order to provide uniformity across disparate data types, transform assembly 110 can be further configured to transform data received in an arbitrary form into a standardized result. Here, it should be noted that such standardized result can include results in any of a plurality of formats including, for example, a tabular result, a JavaScript Object Notation (JSON) result, an Atom Syndication Format (ATOM) result, a Really Simple Syndication (RSS) result, or an Extensible Markup Language (XML) result. The standardized result can then be further processed by executing third party code, if desired, prior to outputting the outgoing response.

It is contemplated that runtime unit 100 will thus provide content providers with a desirable application environment for transforming the current behavior of their web service into behavior compliant with providing information as a service. In an aspect, runtime unit 100 facilitates a unification of return values associated with on-boarded web services towards standardized result sets. By providing such unification, datasets originating from both web services and relational stores can be managed in a uniform manner. Further aspects are also contemplated in which web services are mapped onto parameterized functions that return standardized result sets. Indeed, by mapping web services onto parameterized functions, relational store capabilities of web services data can be realized including for example, projection, filtering, ordering, joining, and even the ability to accept a serialized language integrated query (LINQ) expression tree as input.

In another aspect, runtime unit 100 enables content providers to on-board a large range of web services with different "feature levels" (i.e., levels of functional support). For this particular embodiment, it is contemplated that such feature levels can be configured during on-boarding of a web service, regardless of whether the web service is delivering the feature, and/or whether the feature is provided by runtime unit 100. By implementing this approach, a gradual increase in functionality is enabled, which allows for differentiated offerings by the content providers. Content providers can thus be charged based on the particular value(s) of application programming interfaces (APIs) they utilize in their feature level.

In another aspect, it is contemplated that transformations may be utilized through a query to produce a bindable schema to user interface elements such as charts and graphs. Namely, embodiments are disclosed whereby content providers can use and extend the transformation methods described herein to bind to visual elements such as charts and graphs. Here, it should be further noted that transformations can also be attached to assets, which go beyond developer scenarios.

In yet a further aspect, runtime unit 100 can be configured to facilitate a custom worker role. Within such embodiment, well-defined APIs and a configurable pipeline of transformation functions can be offered, wherein operational management support can be provided such as, scaling, security patches, health monitoring, etc. For this particular embodiment, a mechanism is also disclosed whereby independent software vendors (ISVs) can plug in their solutions for any of a various scenarios including, for example, complex on-boarding and/or billing scenarios.

Figure 2:
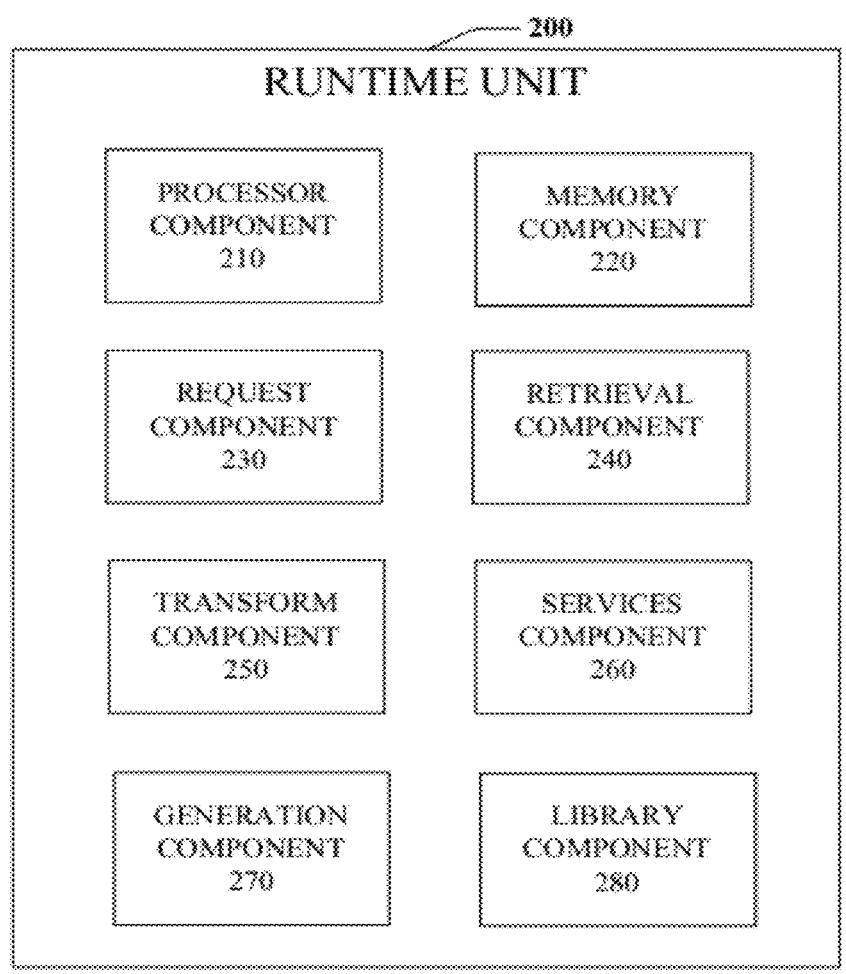
FIG. 2 is a block diagram illustrating an exemplary runtime unit configured to facilitate dataset transformations according to an embodiment.

Referring next to FIG. 2, a block diagram of an exemplary runtime unit configured to facilitate dataset transformations according to an embodiment is provided. As shown, runtime unit 200 can include processor component 210, memory component 220, request component 230, retrieval component 240, transform component 250, service component 260, generation component 270, and library component 280.

In one aspect, processor component 210 is configured to execute computer-readable instructions related to performing any of a plurality of functions. Processor component 210 can be a single processor or a plurality of processors dedicated to analyzing information to be communicated from runtime unit 200 and/or generating information that can be utilized by memory component 220, request component 230, retrieval component 240, transform component 250, service component 260, generation component 270, and/or library component 280. Additionally or alternatively, processor component 210 can be configured to control one or more components of runtime unit 200.

In another aspect, memory component 220 is coupled to processor component 210 and configured to store computer-readable instructions executed by processor component 210. Memory component 220 can also be configured to store any of a plurality of other types of data including generated by any of request component 230, retrieval component 240, transform component 250, service component 260, generation component 270, and/or library component 280. Memory component 220 can be configured in a number of different configurations, including as random access memory, battery-backed memory, hard disk, magnetic tape, etc. Various features can also be implemented upon memory component 220, such as compression and automatic back up, e.g., use of a Redundant Array of Independent Drives configuration.

Runtime unit 200 can also include request component 230 and retrieval component 240. Within such embodiment, request component 230 can be configured to receive requests for consuming data associated with a content provider and stored in at least one database, whereas retrieval component 240 is configured to retrieve the data from a web service in an arbitrary form. Here, to facilitate retrieving data stored in any of a plurality of forms, retrieval component 240 can be configured to map the web service onto a parameterized function.

As illustrated, runtime unit 200 can further include transform component 250, which is configured to transform data retrieved by retrieval component 240 into a standardized result. In an aspect, data transformed by transform component 250 can be further processed while in its transformed state. To facilitate such embodiment, runtime unit 200 can include services component 260, which is configured to process standardized results in any of a plurality of ways. For instance, it is contemplated that such processing may include performing a projection, a filtering, an ordering, and/or a joining operation on the standardized result. Other embodiments are also contemplated, wherein the retrieved data is transformed into a tabular result configured to accept a serialized language integrated query (LINQ) expression tree as input.

In an aspect, services component 260 can also be configured to process standardized results according to a hierarchy of feature levels. Namely, an embodiment is disclosed in which a feature level is associated with each content provider, wherein services component 260 is configured to limit its processing of transformed data to a set of operations authorized by the particular feature level associated with a corresponding content provider. Within such embodiment, it is further contemplated that feature levels can be toggled according to an input received from the content provider. Indeed, since content providers may desire/require different levels of support, services component 260 can be configured to bill content providers according to the particular feature level selected by each content provider. A scalable billing model is thus disclosed in which each feature level can be monetized based on a location of the feature level within the hierarchy. For example, a feature level that provides more processing capabilities for the transformed data can be priced higher than another feature level which may provide less processing capabilities.

As illustrated, runtime unit 200 can also include generation component 270, which is configured to generate transform assemblies based on inputs received from content providers. For this particular embodiment, transform component 250 can be configured to transform data via such transform assemblies. Moreover, transform assemblies can be generated, which transform data by calling any of a plurality of transform functions. To this end, it is contemplated that at least a subset of the transform functions may be stored locally and/or externally. For instance, in an aspect, library component 280 can be configured to maintain a local library of selectable transform functions. In another aspect, however, retrieval component can be configured to access an external library of selectable transform functions.

Figure 3:
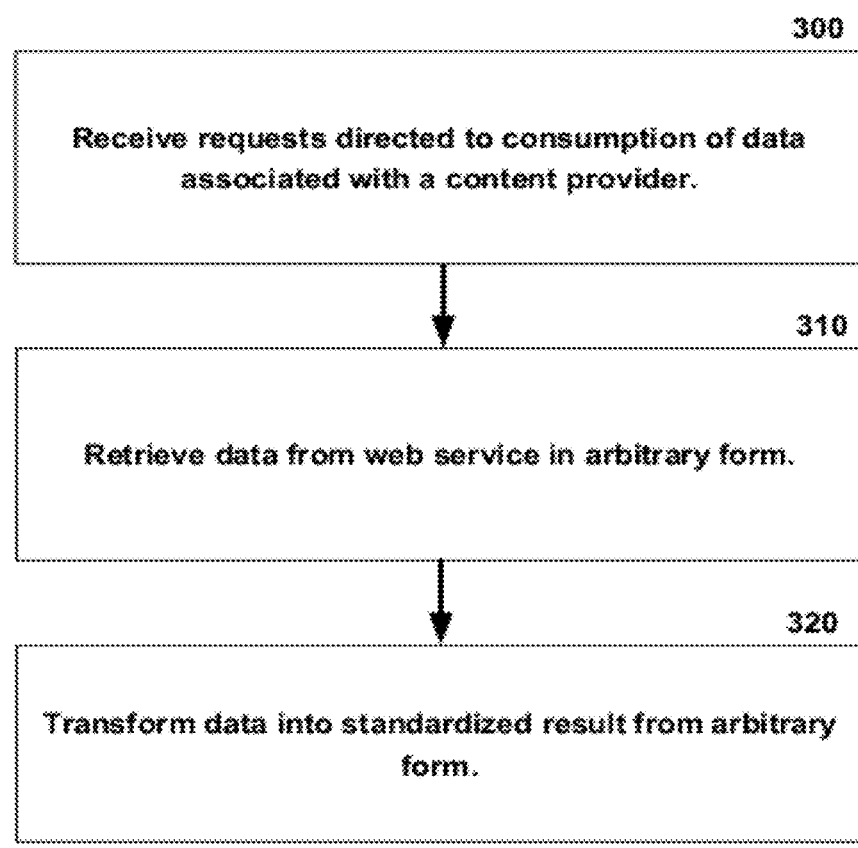
FIG. 3 is a flow diagram illustrating an exemplary non-limiting embodiment for providing a runtime for dataset transformation according to an embodiment.

FIG. 3 is a flow diagram illustrating an exemplary non-limiting embodiment for providing a runtime for dataset transformation according to an embodiment. At 300, requests directed towards a consumption of data associated with a content provider are received. The requested data is then retrieved from a web service in an arbitrary form at 310, followed by the retrieved data being transformed into a standardized result from the arbitrary form at 320.

Figure 4:
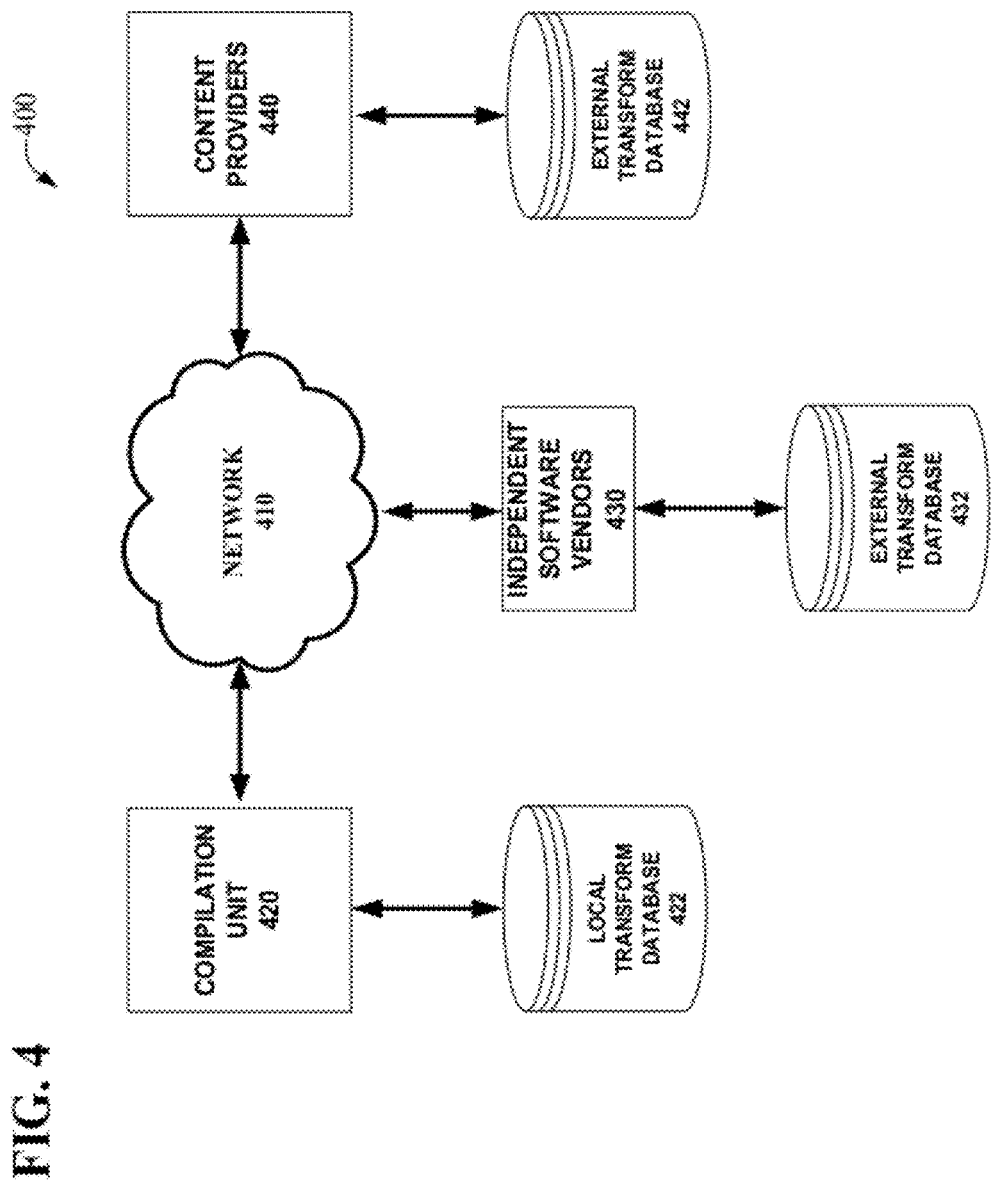
FIG. 4 illustrates an exemplary system that facilitates generating a transformation assembly according to an embodiment.

FIG. 4 illustrates an exemplary system that facilitates generating a transformation assembly according to an embodiment. As illustrated, system 400 can include compilation unit 420, independent software vendors 430, and content providers 440, which are communicatively coupled via network 410. For this particular embodiment, compilation unit 420 can be configured to provide content providers 440 with a user interface to generate transform assemblies utilized by a web services runtime unit, as disclosed herein. To this end, it should be noted that such transform assemblies can be generated from transform functions within local transform database 422 provided by compilation unit 420, as well as from the on-boarding of transformation functions from external transform databases 432 and 442, respectively provided by independent software vendors 430 and content providers 440. With respect to externally provided transform functions, it should be further noted that such functions could be allowed to run within a worker role hosted by content providers 440 themselves to "enrich" responses, and/or such functions could be could run within an isolated worker role hosted by compilation unit 420. Indeed, compilation unit 420 may be configured to provide a configurable pipeline of transformation functions which allow independent software vendors 430 to provide value-add services to help create/maintain such transform assemblies, wherein on-boarding tools and transformation libraries can be executed from within compilation unit 420.

In a further aspect, compilation unit 420 can provide content providers 440 with a "no source code, just configuration" experience to configure their web service in the runtime unit. Within such embodiment, transform assemblies are generated automatically with a metadata API and runtime APIs, wherein a manifest based on a conceptual model (CSDL) is utilized. This approach allows content providers 440 to on-board transform assemblies without writing code, while still reaping the run-time benefits provided by the runtime unit.

Here, it should be noted that a configuration-based approach defines how to assemble a transformation, wherein content providers 440 may only specify repeating nodes and how to "fill" the properties of such repeating nodes. In an aspect, XPath expressions can be used to fill each of these properties. Exemplary properties can, for example, include how to expose the web service, the web service uri to call, the input parameters, and/or the definition of the results, including how to "flatten" an XML response of the web service.

Figure 5:
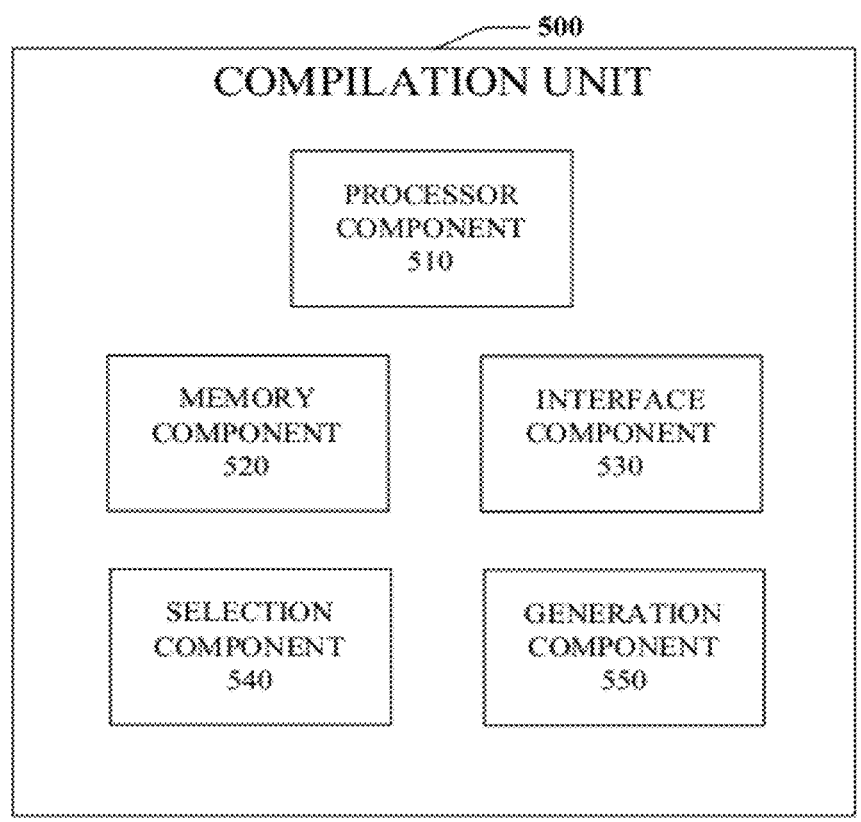
FIG. 5 is a block diagram illustrating an exemplary compilation unit configured to generate a transformation assembly according to an embodiment.

Referring next to FIG. 5, a block diagram illustrates an exemplary compilation unit configured to generate a transformation assembly in accordance with various aspects. As illustrated, compilation unit 500 can include processor component 510, memory component 520, interface component 530, selection component 540, and generation component 550.

Similar to processor component 210 in runtime unit 200, processor component 510 is configured to execute computer-readable instructions related to performing any of a plurality of functions. Processor component 510 can be a single processor or a plurality of processors dedicated to analyzing information to be communicated from compilation unit 500 and/or generating information that can be utilized by memory component 520, interface component 530, selection component 540, and/or generation component 550. Additionally or alternatively, processor component 510 can be configured to control one or more components of compilation unit 500.

In another aspect, memory component 520 is coupled to processor component 510 and configured to store computer-readable instructions executed by processor component 510. Memory component 520 can also be configured to store any of a plurality of other types of data including data generated by any of interface component 530, selection component 540, and/or generation component 550. Here, it is noted that memory component 520 is analogous to memory component 220 in runtime unit 200. Accordingly, it can be appreciated that any of the aforementioned features/configurations of memory component 220 are also applicable to memory component 520.

As illustrated, compilation unit 500 can also include interface component 530 and selection component 540. Within such embodiment, interface component 530 is configured to display a user interface to a content provider, whereas selection component 540 is configured to identify at least one transform function selected by the content provider via the user interface. For this particular embodiment, it is contemplated that content providers are associated with data consumable from an infrastructure providing information as a service.

In a further aspect compilation unit 500 can also include generation component 550, which is configured to generate a transform assembly based on the transform function(s) selected by the content provider. Here, it is contemplated that transform assemblies generated by generation component 550 can be configured to retrieve data from a web service in an arbitrary form, and transform the retrieved data into a standardized result. Moreover, transform assemblies can be generated which transform data into a standardized result, from an arbitrary form, by calling transform functions selected by the content provider. To this end, it should be noted that transform assemblies can be configured to call externally stored transform functions, as well as locally stored transform functions.

In a further aspect, it is contemplated that generation component 550 can be configured to generate transform assemblies in any of a plurality of ways. For instance, generation component 550 can be configured to bind transform functions to a graphical representation of transformed data. Generation component 550 can also be configured to link multiple transform functions selected by a content provider. In a particular embodiment, generation component 550 is configured to link a first transform function with a second transform function, wherein at least one of the first transform function or the second transform function are provided by an independent software vendor (ISV).

It should also be noted that generation component 550 can be further configured to provide content providers with a user-friendly mechanism for generating custom transform assemblies. For example, an embodiment is disclosed in which a codeless input is received from the content provider. Within such embodiment, generation component 550 is configured generate transform assemblies by executing at least one application programming interface (API) according to a manifest based on a conceptual model (CSDL).

Figure 6:
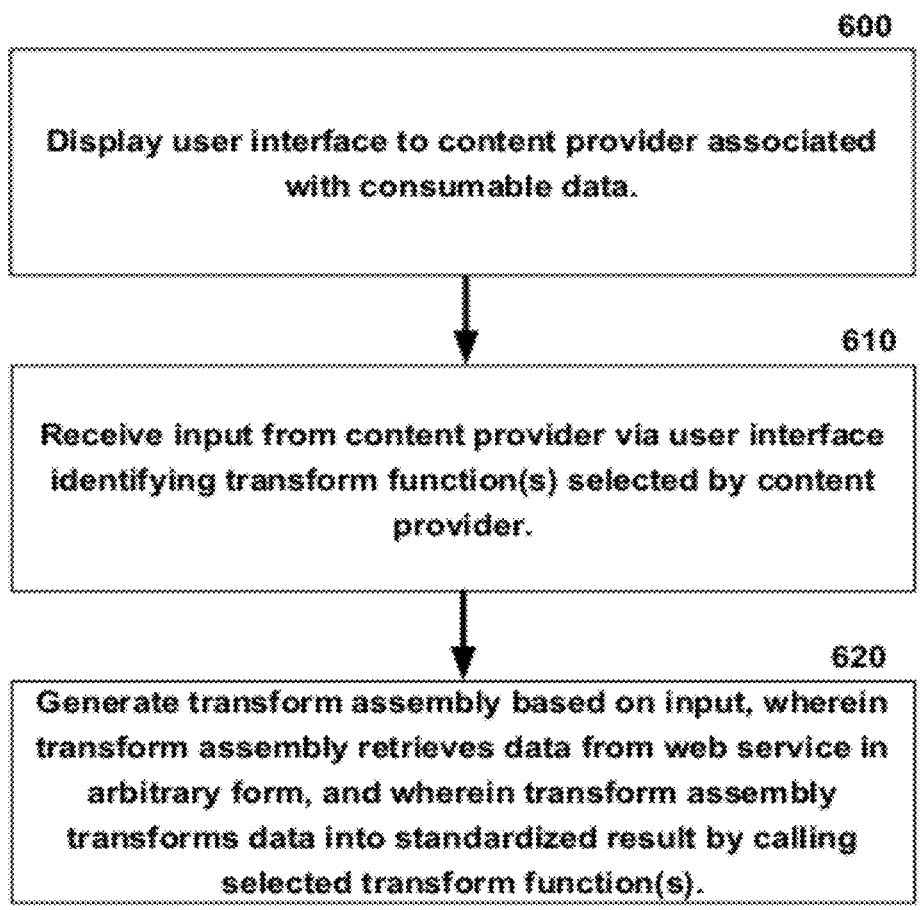
FIG. 6 is a flow diagram illustrating an exemplary non-limiting embodiment for generating a transformation assembly according to an embodiment.

FIG. 6 is a flow diagram illustrating an exemplary non-limiting embodiment for generating a transformation assembly according to an embodiment. At 600, a user interface is displayed to a content provider associated with consumable data. Next, at 610, an input is received from the content provider via the user interface identifying at least one transform function selected by the content provider. A transform assembly is then generated based on the input at 620, which retrieves data from a web service in an arbitrary form, and which transforms the retrieved data into a standardized result by calling the transform function(s) selected by the content provider.

Figure 7:
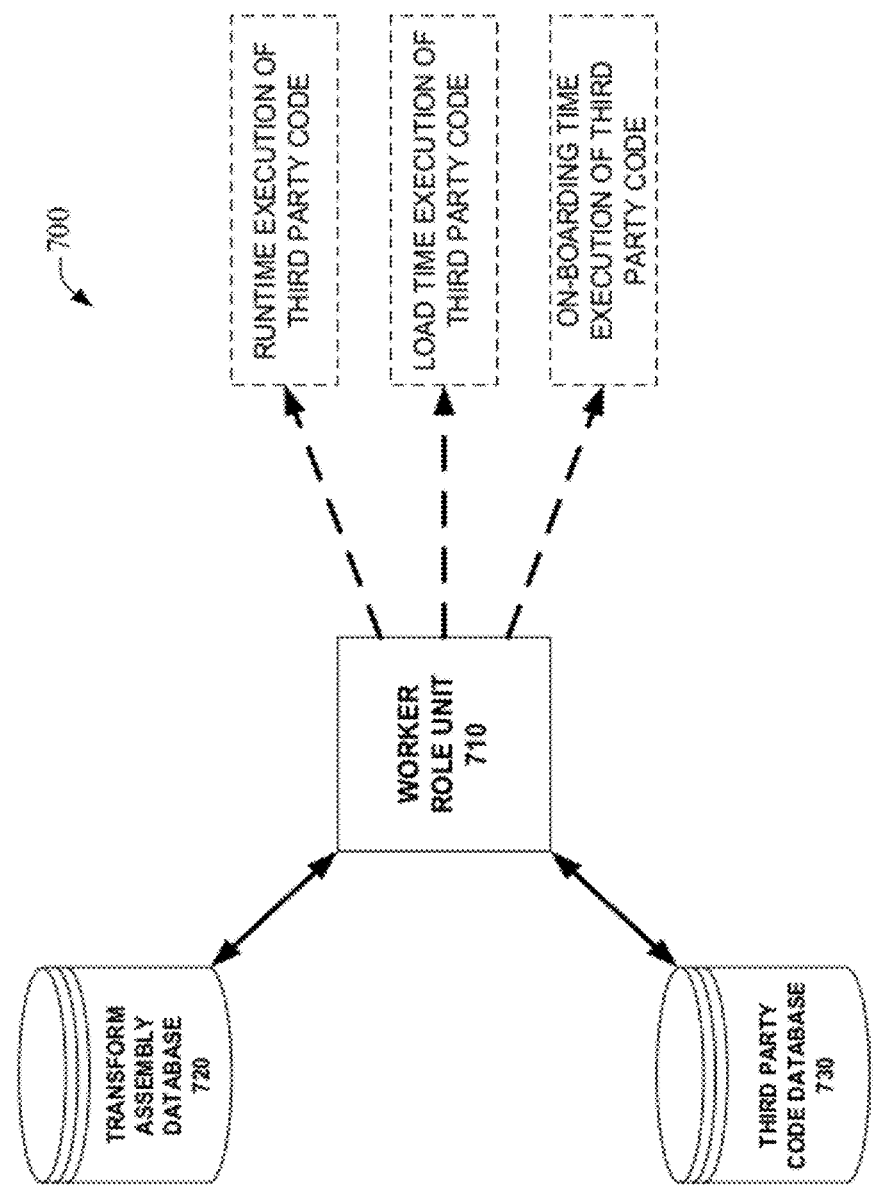
FIG. 7 illustrates an exemplary system that facilitates managing an execution of third party code according to an embodiment.

FIG. 7 illustrates an exemplary system that facilitates managing an execution of third party code according to an embodiment. As illustrated, system 700 can include worker role unit 710, which is communicatively coupled to transform assembly database 720 and third party code database 730. Within such embodiment, worker role unit 710 can be configured to provide a custom worker role, which allows for the managed execution of third party code. Here, it should be noted that such custom worker role can be completely managed by the web services runtime unit disclosed herein, resulting in the ability to provide runtime, load time and on-boarding time features/services.

It is contemplated that any of a plurality of runtime features/services may be supported via third party code. For instance, an automatic/configurable scale out and load balancing of worker roles can be provided. Indeed, with increased demand, additional instances of the custom worker role will be instantiated, which will result in additional costs for the content provider, but which will be directly attributable to revenue generation. Other desirable runtime features/services can include integrating into a billing platform for information as a service, which can allow for custom billing events. Health monitoring, both of worker role unit 710, as well as the back-end web service can also be provided. An isolation of execution can also be supported, as provided by the worker role concept. Further runtime features/services which are supportable can include compliance, logging, formatting, paging, projection (i.e., augmenting a basic web service to provide more features, as well as the ability to compose with other third party services (i.e., a join feature).

Several load time features/services are also contemplated. For instance, a feature/service can be implemented in which a transformation assembly exposes a standard interface to be called by the runtime and return a standard result set. A feature/service can also be implemented in which a transformation assembly exposes an API to access a metadata document, describing the details of a result set.

With respect to on-boarding time, exemplary features/services are also disclosed. For instance, a feature/service can be implemented in which an upload of the content provider's transformation assembly includes code to call the web service and transform the response into a well-defined result set. A code verification feature/service for the transformation assembly at "on-board" time can also be implemented to ensure security compliance. Furthermore, semantics of parameters and columns in a result set can be defined to create a basis for the meshing/composing of datasets.

Figure 8:
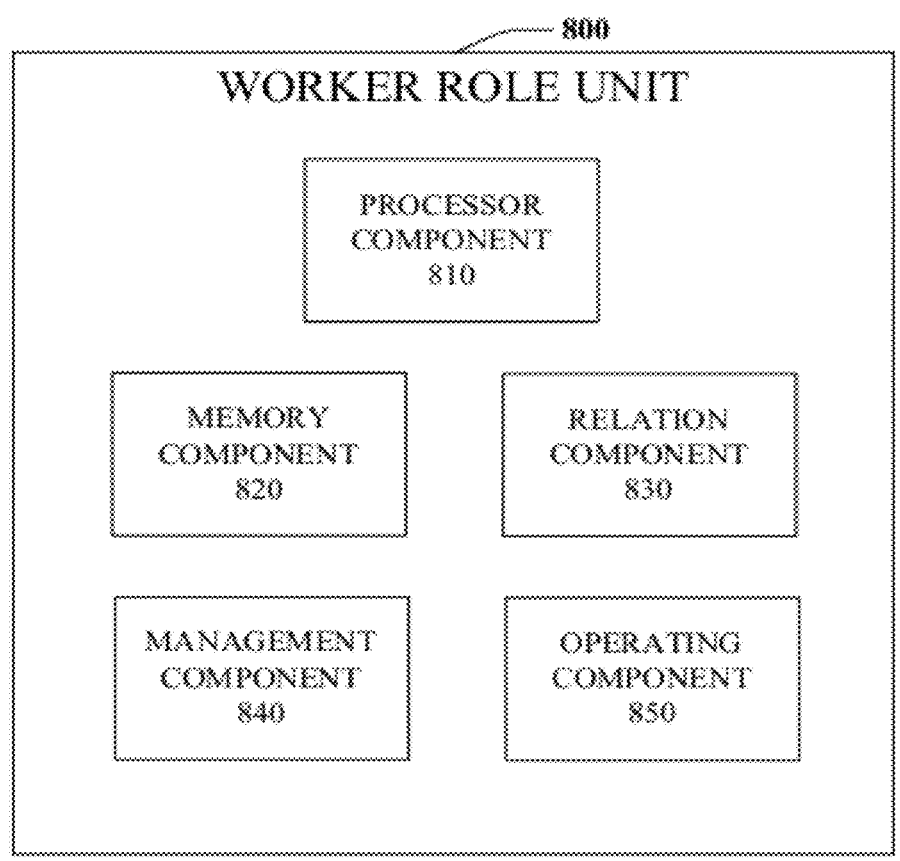
FIG. 8 is a block diagram illustrating an exemplary worker role unit configured to manage an execution of third party code according to an embodiment.

Referring next to FIG. 8, a block diagram illustrates an exemplary worker role unit configured to manage an execution of third party code in accordance with various aspects. As illustrated, worker role unit 800 can include processor component 810, memory component 820, relation component 830, management component 840, and operating component 850.

Similar to processor components 210 and 510 in resource management unit 200 and compilation unit 500, respectively, processor component 810 is configured to execute computer-readable instructions related to performing any of a plurality of functions. Processor component 810 can be a single processor or a plurality of processors dedicated to analyzing information to be communicated from worker role unit 800 and/or generating information that can be utilized by memory component 820, relation component 830, management component 840, and/or operating component 850. Additionally or alternatively, processor component 810 can be configured to control one or more components of worker role unit 800.

In another aspect, memory component 820 is coupled to processor component 810 and configured to store computer-readable instructions executed by processor component 810. Memory component 820 can also be configured to store any of a plurality of other types of data including data generated by any of relation component 830, management component 840, and/or operating component 850. Here, it is noted that memory component 820 is analogous to memory components 220 and 520 in resource management unit 200 and compilation unit 500, respectively. Accordingly, it can be appreciated that any of the aforementioned features/configurations of memory components 220 and 520 are also applicable to memory component 820.

As illustrated, worker role unit 800 can also include relation component 830. Within such embodiment, relation component 830 is configured to associate a third party code with a transform assembly. Here, it is contemplated that transform assemblies are configured to retrieve data from a web service in an arbitrary form, and transform the retrieved data into a common intermediate format.

In another aspect, worker role unit 800 includes management component 840, which is configured to manage an execution of the third party code. Within such embodiment, management component 840 can be configured to execute different types of third party code to provide any of various transform assembly services. It should be noted that such services can include runtime services, load time services, and/or on-boarding services. For instance, management component 840 can be configured to execute third party code at runtime to provide a runtime service associated with a particular transform assembly. However, management component 840 can also be configured to execute third party code at load time to provide a load time service, as well as at on-boarding time to provide an on-boarding time service.

Worker role unit 800 can also include operating component 850. Within such embodiment, operating component 850 is configured to operate transform assemblies according to the third party code managed by management component 840. Moreover, depending on the type of service facilitated by management component 840, operating component 850 can be configured to operate various transform assembly aspects including, for example, aspects directed towards a runtime service, a load time service, and/or an on-boarding time service. In a particular embodiment, operating component 850 can be configured to operate a billing aspect of a transform assembly based on third party code to facilitate billing content providers individually according to their desired suite of services.

Figure 9:
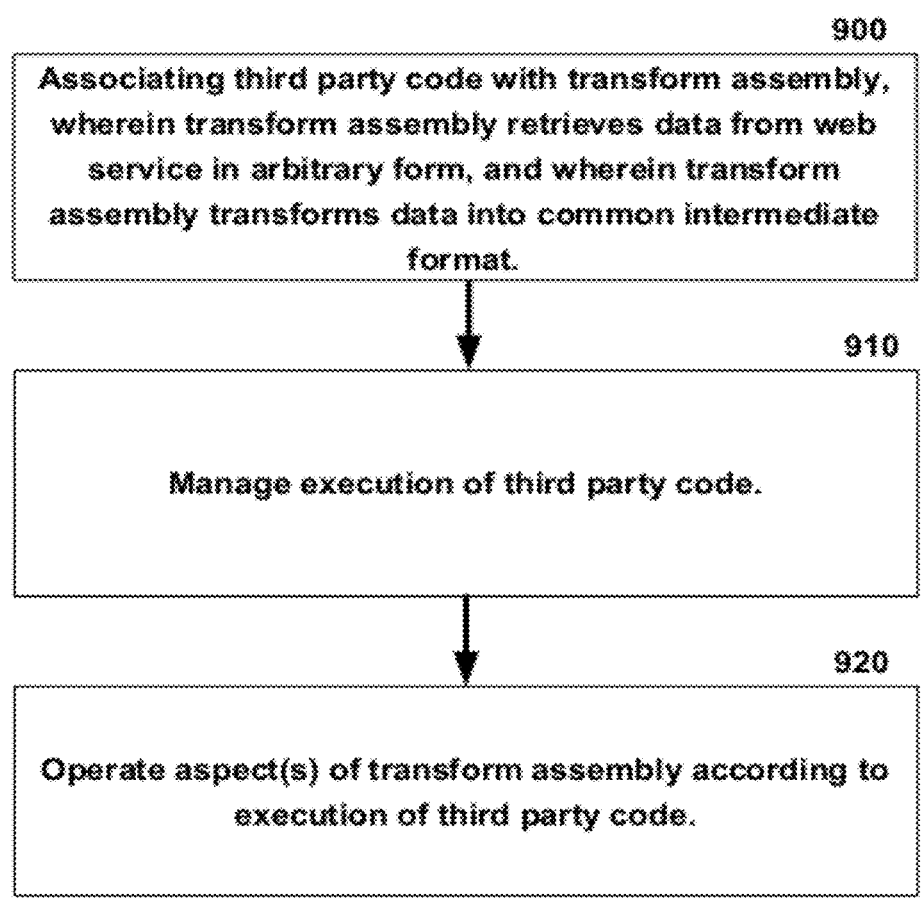
FIG. 9 is a flow diagram illustrating an exemplary non-limiting embodiment for managing an execution of third party code according to an embodiment.

FIG. 9 is a flow diagram illustrating an exemplary non-limiting embodiment for managing an execution of third party code according to an embodiment. At 900, a third party code is associated with a transform assembly. For this particular embodiment, the transform assembly retrieves data from a web service in an arbitrary form, and transforms the retrieved data into a common intermediate format. Next, an execution of the third party code is managed at 910. At least one aspect of the transform assembly is then operated according to the execution of the third party code.

Supplemental Context for Information as a Service

The following description contains supplemental context regarding potential non-limiting infrastructure, architectures and/or associated services to further aid in understanding one or more of the above embodiments. Any one or more of any additional features described in this section can be accommodated in any one or more of the embodiments described above with respect to updating of data set semantics and corresponding access APIs for information as a service from any platform. While such combinations of embodiments or features are possible, for the avoidance of doubt, no embodiments set forth in the subject disclosure are to be considered limiting on any other embodiments described herein.

By way of some additional background, today, while information can be obtained over networks, such as the Internet, today's offerings tend to the proprietary in terms of access and framework, and are thus limited in terms of third party provider participation. For instance, currently, there is no adequate business model for commercial content providers to publish their data in a way that does not relinquish at least some of the value of such commercial content, and thus historically, owners of valuable content have tended to expose that content through limited proprietary means. Or, in instances where storage of such content is provided by secure cloud storage providers, there is little value in storage alone when a consumer wades through thousands of tables to potentially find an item of interest as a result. In addition, even where cloud storage providers attempt to collect data from various providers, at most such providers can only boast a modest, small or incomplete catalog of data.

Much of the stunting of potential growth in this area has been the result of mistrust over handling and IP, e.g., copyrights. In short, big players don't trust cloud providers with crown jewels because a single compromise can end the value of the data. In addition, such cloud providers to date have had a weak position with respect to information workers who wish to extract value from such data for their informational needs, and in addition, due to the proprietary nature of such systems, developers have thus far had limited ability to expand tools for developing informational capabilities.

Accordingly, as described for one or more embodiments, an infrastructure for information as a service is provided that accommodates all classes of individuals: publishers, developers, information workers, and consumers. The infrastructure enables information discovery, e.g., the ability to discover, acquire, and consume structured and blob datasets to power any application—on any platform and any form factor, e.g., any screen size. The infrastructure further enables brokerage business, e.g., a partner driven ecosystem and global reach to deliver data and functionality to developers and information workers. The infrastructure also allows analytics and reporting, e.g., a single click analysis to augment private data with public data. In this regard, due to the open nature of various implementations of the infrastructure, any application developer can develop mobile, cloud, and/or desktop applications to facilitate the publishing, processing, querying and/or retrieval of data.

To write applications, one can register for account information, e.g., sign in with Live ID, and be provided with an account key by which to access the "blob" via structured and real-time web services enabled for the infrastructure for information as a service as described for one or more embodiments herein. In one aspect, developers can explore the APIs visually before coding begins. For instance, a service explorer module or set of modules can be used by developers to visually construct representational state transfer (REST) API queries and preview the content according to a variety of packages, such as, but not limited to extensible markup language (XML), ATOM, RAW (for blob and real-time content), or in a table view, e.g., for structured data. For example, a developer merely provides his or her account key and selects to preview the content.

Accordingly, developers can build mobile, desktop or service applications on any platform. While resulting REST queries can be copied into a new developer application, the infrastructure for information as a service also enables the ability to consume automatically generated C# proxy classes to eliminate any need to create a local object model or generate and understand the details of XML or web service code. In this regard, in another non-limiting beneficial aspect, a developer can download the proxy classes and include them in the developer's applications to consume service data with as few as a couple lines of code.

In this regard, the various embodiments of an infrastructure for information as a service allow developers and information workers to find, acquire, and consume data in their applications and analytics scenarios instantly, periodically, or over some other function of time specified by the application developer. As mentioned, a developer obtains an account key which then accompanies web services calls to the network services enabling information as a service as described for one or more embodiments herein for content requests and subscribing to the content of interest.

Thus, in one aspect, the account key provided by the infrastructure for information as a service as described for one or more embodiments herein is the developer's private key. This key enables billing and reporting on content used in connection with the developer's applications. As such, this private developer key is not to be shared without purpose, and precautions in securing the key are to be taken where developing native applications running on mobile or desktop solutions and planning to integrate the key as part of the deployment. For example, cryptographic storage can be used to ensure the key is not cracked.

In addition to the account key, which is used to track the application consuming the content, the user ID can be a particular user ID that is a globalidentifier (GID) that represents the developer's individual users. This field allows billing for content that is priced on a per-user basis programmatically. For example, if a developer is developing a mobile application with an individual user consuming the application, the developer returns the same GID each time requests are made on behalf of that individual user. However, if the developer is developing a web portal and issuing web service requests on behalf of a variety of users, it is up to the developer to assign a new GID for each user visiting the portal. For example, each registered user can be assigned a GID or each IP address/port combination can be assigned a user ID, GID, etc.

While REST APIs can be constructed on any platform to consume content from the infrastructure for information as a service as described for one or more embodiments herein, in one embodiment, proxy classes can be dynamically generated for services in C#. Achieving this is a matter of downloading the object models, adding them to the current developer project, and updating the account and user values, e.g., particular user values.

If a developer would like to issue requests manually, an example is provided below, but for any service, the preview function can be used, or the URLs created from the Service Explorer can be invoked as well. An exemplary, non-limiting REST query to a sample dataset is illustrated below. It is noted that some or all calls can be secure socket layer (SSL) secured.

https://api.sqlazureservices.com/UnService.svc/UNESCO(120)

The $accountKey and $uniqueUserId elements are also placed in the header of the request, which appears as follows, for example:

$accountKey={developer account key}
$uniqueUserID={a GID representing the user}

The value in $accountKey represents the developer's account key, found in the Accounts Tab and the value in $uniqueUserID represents the GID for the user accessing the service.

The above example authenticating approach is non-limiting in that other authenticating approaches are also possible, and thus the various embodiments described herein can implement any alternative authentication approaches. For instance, Basic Authorization (RFC 1945), with the AccountKey as the password, or Access Control Server (ACS) using a token based approach, or other token based approaches can be used as well.

Accordingly, the infrastructure for information as a service as described for one or more embodiments herein is a new service or framework allowing developers and information workers to easily discover, purchase, and manage premium data subscriptions in any platform. The infrastructure is an information marketplace that brings data, imagery, and real-time web services from leading commercial data providers and authoritative public data sources, as well as non-authoritative publishers, together into a single or multiple locations that are unified under a common provisioning and billing framework. Additionally, developers and information workers can consume this premium content with virtually any platform, application or business workflow.

Some exemplary, non-limiting scenarios for using the infrastructure for information as a service as described for one or more embodiments herein include: (a) finding premium content to next-generation "killer apps" for consumer and business scenarios, (b) discovering and licensing valuable data to improve existing applications or reports, (c) bringing disparate data sets together in innovative ways to gain new insight into business performance and processes, e.g., aggregation algorithms, (d) instantly and visually exploring APIs across all content providers for blob, structured, and real-time web services and (e) consuming third party data inside existing applications and data base systems, such as existing word processing, spreadsheet, database query systems, etc., for rich reporting and analytics.

Benefits for developers include: (a) trial subscriptions allow content to be investigated and applications to be developed without paying data royalties, (b) simple transaction and subscription models allow "pay as you go or grow" access to multi-million dollar datasets, (c) consistent REST based APIs across datasets facilitate development on any platform, (d) visually building and exploring APIs, previewing results and (e) automatic C# proxy classes provide instant object models and eliminate the need to write tedious XML and web service code.

Benefits for Information Workers include: (a) integration with PowerPivot to easily work with data in existing spreadsheet software such as, but not limited to, Excel, (b) simple, predictable licensing models for acquiring content and (c) the ability to consume data from a structured query language (SQL) Server, SQL Database, and other pre-existing assets.

Benefits for Content Partners include: (a) easy publication and on-boarding process regardless of blob data, structured data, or dynamic web services, (b) developer tooling on the selected platform to ease development, e.g., via.NET or other runtime system development, (c) exposing developer content to global developer and information worker community, (d) content discovery and integration inside pre-existing content consumption applications and (e) a scalable cloud computing platform handles storage, delivery, billing, and reporting on behalf of all parties.

In a non-limiting implementation of the infrastructure for information as a service as described for one or more embodiments herein, some features for Rich Web Services include: (a) secure, REST based model for consuming services across the entire content catalog, (b) dynamic pagination built into the APIs to simplify access, (c) Standard ATOM 1.0 feeds are available for most of the services and (d) consistent billing, provisioning, and usage reporting across all services.

In a non-limiting implementation of the infrastructure for information as a service as described for one or more embodiments herein, some features for a Service Explorer component include: (a) C# proxy classes generated to simplify development, (b) preview of data in tabular form and as a feed, such as an ATOM 1.0 feed, if supported, (c) invocation of the service to understand the results that the compiled service call returns, (d) discovery of documentation and sample values for each of the parameters and (e) instant copying of the visually built URL for a service call into clipboard to ease development.

In a non-limiting implementation of the infrastructure for information as a service as described for one or more embodiments herein, some features for a Marketplace Integration and Discovery Portal component include: (a) discovery of new data across domains including consumers and businesses, (b) management of service subscriptions and usage limits, (c) management of account keys to access the services and (d) detailed access reporting containing the services/datasets that were accessed, grouped by date and by account key.

The infrastructure provides a variety of value propositions for content owners, application developers/ISVs and for information workers and other consumers/subscribers. For content owners, the infrastructure enables monetization from data (for data providers who charge for the data), in addition to social benefits for data providers who do not charge for data, but derive benefit from the publication of such data in other ways. Due to the openness of the infrastructure, content owners enjoy greater availability and reach of data to ISVs and consumers/information workers, and all of this comes at a lower cost, particularly over developing a proprietary model as in the past.

For application developers/ISVs, the infrastructure enables access to data in a consistent format, variable and low-cost pricing model for data access. predictable pricing, profit potential from consumers/IWs using the applications built using the data, broader reach to consumers through any platform and a single billing and data source For information workers/consumers, the infrastructure enables added value from applications, consumption of data in current large object (LOB) or IW software, a variable and low-cost pricing model for data access in addition to a single billing and data source.

Accordingly, the infrastructure solves a current customer and developer pain point with a potentially significant revenue upside, creates business intelligence opportunities attached with instant data for modeling, reporting, analysis and trending and creates adoption and stickiness for any platform by encouraging data owners to store their data via the infrastructure, thereby differentiating the infrastructure's value proposition when compared with conventional cloud storage environments.

Figure 10:
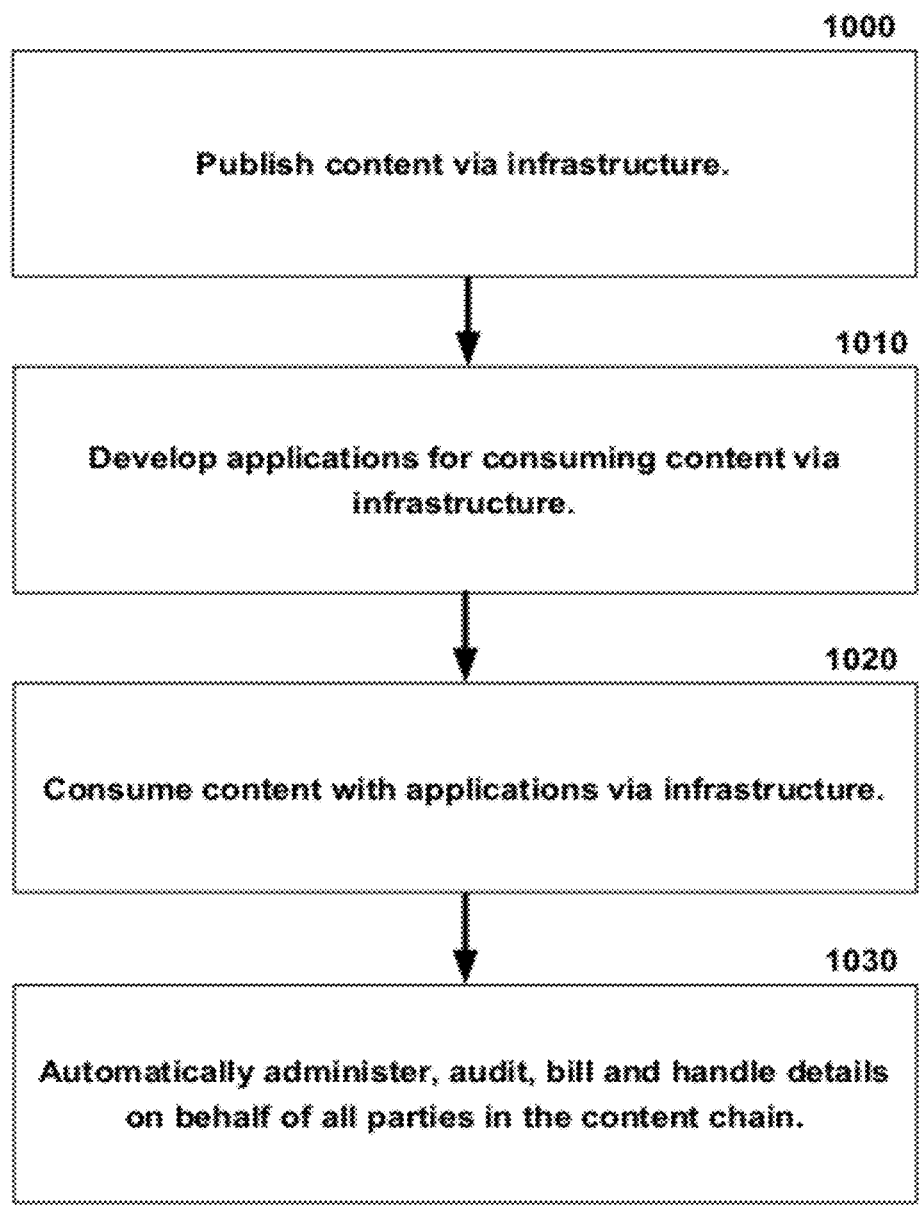
FIG. 10 is a flow diagram illustrating an exemplary sequence for a non-limiting infrastructure for information provided as a service from any platform.

As shown in the flow diagram of FIG. 10, at 1000, described herein are various ways for content owners or publishers to publish data via the infrastructure. At 1010, there are a variety of tools that allow developers to developer applications for consuming the data via the infrastructure. At 1020, consumers or information workers use the applications or can directly query over the data to consume the data. Lastly, the infrastructure provides a rich variety of tools at 1030 that enable automatic administration, auditing, billing, etc. on behalf of all parties in the content chain, enabled by the transaction model.

In this regard, some key parties in the infrastructure include data owners, the application developers/ISVs and the consumers/information workers. In general, data owners are entities who want to charge for data, or who want to provide data for free for other reasons, or enforce other conditions over the data. In turn, application developers/ISVs are entities who want to monetize their application (e.g., through advertising, direct payments, indirect payments, etc.), or provide their application for free for some beneficial reason to such entities. Information workers and consumers are those who can use the raw data, or those who want to use an application provided by the application developers.

Figure 11:
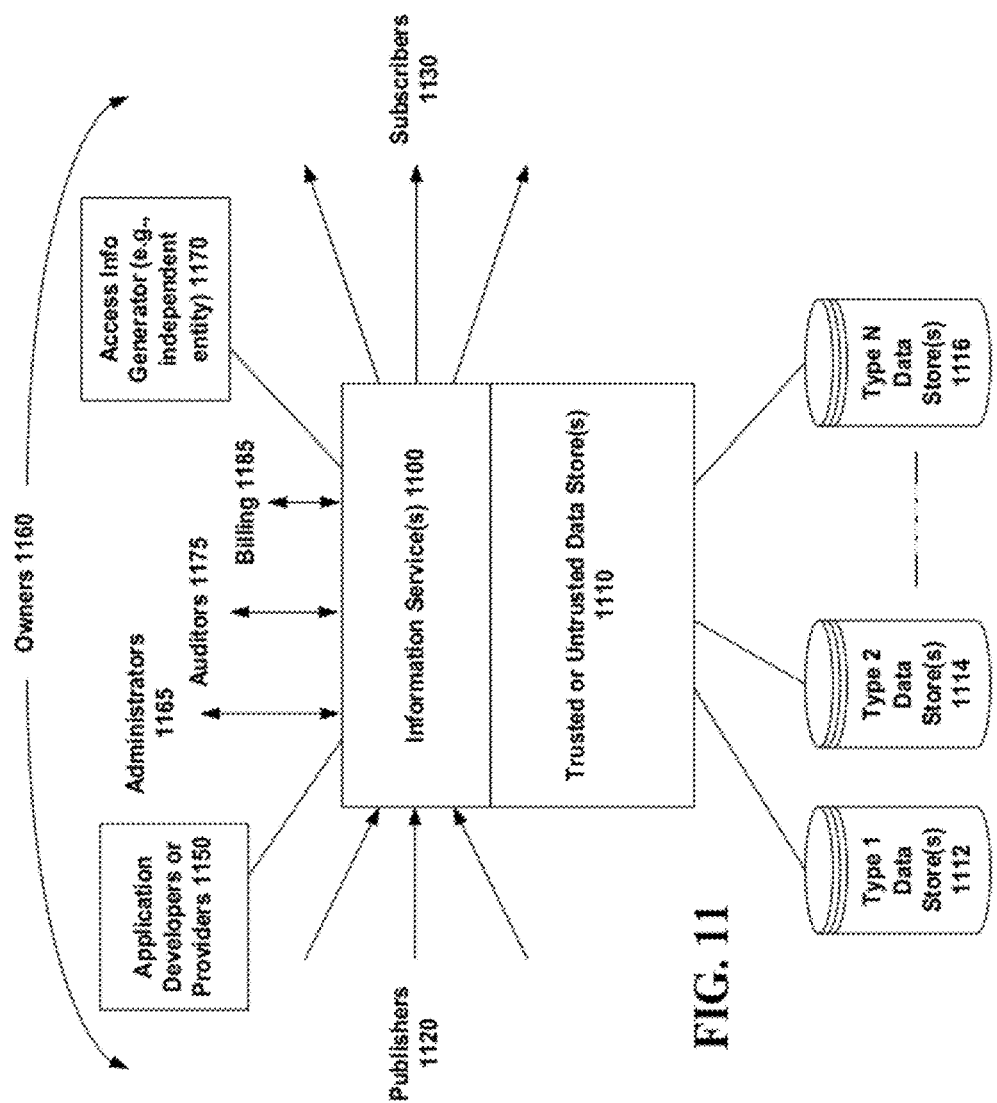
FIG. 11 is a block diagram illustrating an exemplary non-limiting infrastructure for information provided as a service from any platform.

FIG. 11 is a block diagram generally illustrating the various parties that can participate in an ecosystem providing information as a service as described herein. For instance a set of network accessible information services 1100 provide access to a variety of trusted or untrusted data stores 1110, depending on the sensitivity or other characteristics of the data. As shown, thus, what type of data store, 1112, 1114, . . . , 1116 is not so important since the ecosystem supports any kind of data, blob, structured, unstructured, etc. As mentioned, the system includes publishers 1120 that add data to the ecosystem, subscribers 1130 that consume the data and application developers or providers 1150 who help consumption of the data with their applications. An access information generator 1170 can also govern access to the data by various parties through maintaining or enforcing account information, key information, etc. In this respect, content owners 1160 can span any of the roles in that a content owner 1160 can be a publisher 1120, a subscriber 1130 and/or an application developer as well. In one aspect, the common infrastructure for all parties enables administration 1165, auditing 1175, billing 1185 as well as other desired ancillary services to the data transactions occurring across the infrastructure.

In this regard, various embodiments for the user friendly data platform for enabling information as a service from any platform is an infrastructure to enable consumers of data (IWs, developers, ISVs) and consumers of data to transact in a simple, cost effective and convenient manner. The infrastructure democratizes premium (private) and community (public) data in an affordable way to allow IWs to draw insights rapidly, allows developers to build innovative apps using multiple sources of data in a creative manner and enables developers to monetize their efforts on any platform. For instance, the infrastructure supports Pay Per Use as well as Subscription Pricing for Content, Pay for Content ("retail price"—set by content owner), Pay Data Fee ("Shipping and Handling") and BW, and further supports Data fees as a brokerage fee on a per-logical transaction basis (per report, per API, per download, etc.).

For Information Workers (e.g., Office, SQL Server, Dynamics users), the infrastructure supports subscriptions to allow for future EA integration as well as predictable spend requirements (as well as caching to support on and off-premise BI as well as "HPC" workloads). Thus, alternatives include content priced per-user per-month; which may or may not bundle to deliver content packs or per-transaction pricing, e.g., allowing cloud reporting/business intelligence on-demand pricing to eliminate the need to move large amounts of data while allowing per-usage pricing, or vertical apps via report galleries.

For content providers (any data type; any cloud), using any platform, the infrastructure becomes a value proposition to incent sales within any particular desired platform; auto-scaling, higher level SLA possibilities at no additional cost. For some non-limiting examples, data can be secure and associated data in the following domains: Location aware services & data, Commercial and residential real estate, Financial data and services, etc. A non-limiting scenario can include delivery of data to top 30 non-governmental organization (NGO) datasets. In addition, the infrastructure can include the ability to showcase BI & visualization through "Bing for information as a service", HPC, etc. Vertical application opportunities exist as well.

In one non-limiting embodiment, the data brokerage can be analogized to conventional brick and mortar strategies: For instance, capacity can be represented as shelf space (e.g., a mix of structured and unstructured/blob data), cost of goods (COGS) can be represented as square footage, (SA, platform dependency, bandwidth) and content can be represented as merchandise (e.g., optimize content providers to cover COGS, maximize profits from IWs and developers). In various embodiments, an onboarding process can be implemented with quality bars for data and services, as well as accommodation of service level agreements (SLAB).

Figure 12:
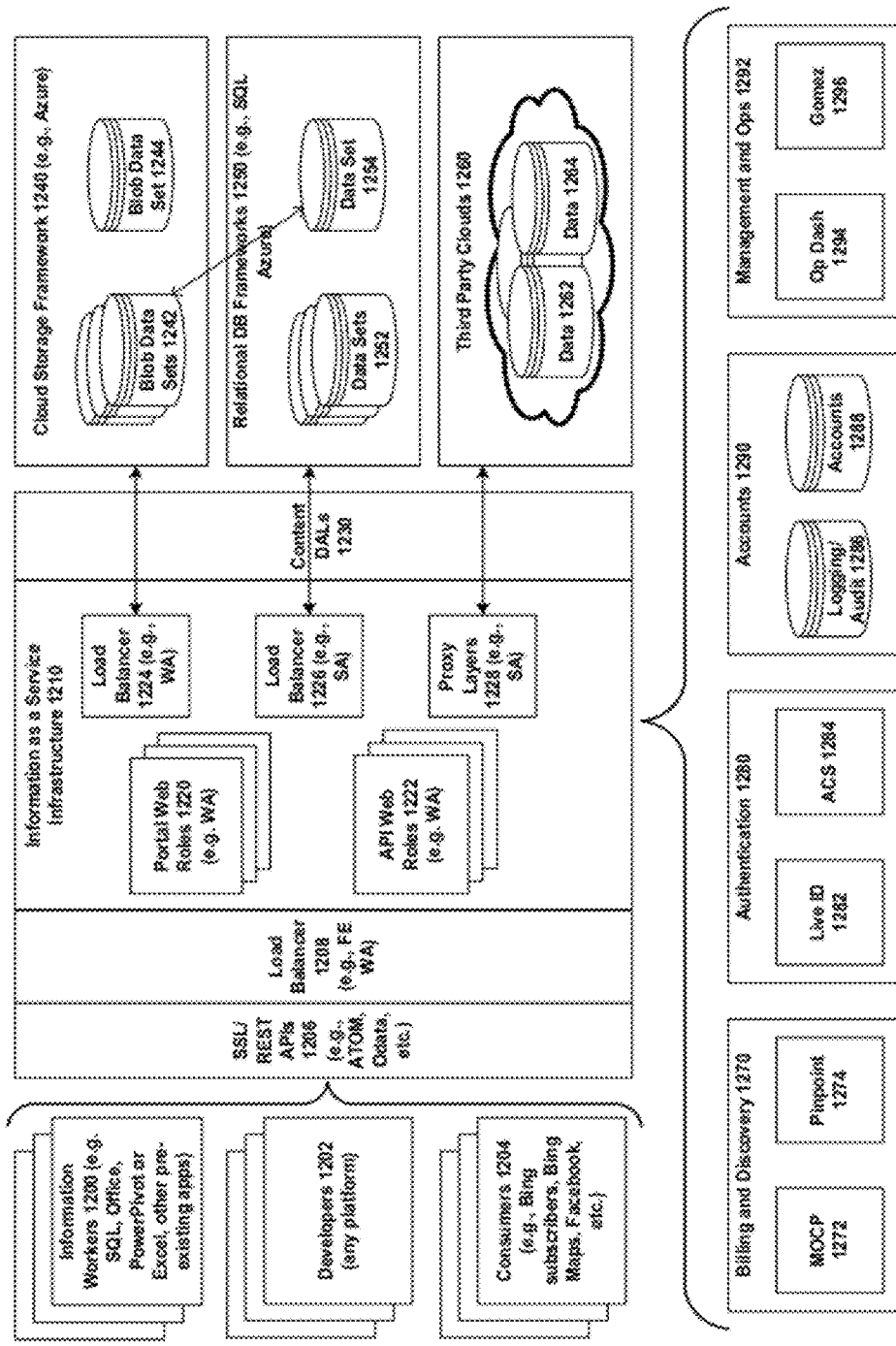
FIG. 12 is a block diagram illustrating an exemplary non-limiting set of implementation specific details for an infrastructure for information provided as a service from any platform.

FIG. 12 is an exemplary non-limiting implementation of the infrastructure 1210 for information as a service as described above according to one or more features. At the interaction side are information workers 1200, developers 1202 and consumers 1204 who can communicate with the infrastructure via SSL/REST based APIs 1206. A load balancer 1208 can be used to help steer traffic in an optimal way. In this regard, the input is routed to portal web roles 1220 or API web roles 1222. From the infrastructure 1210 to the data side is additional load balancing 1224 or 1226 (e.g., WA or SA) for access to blob data sets 1242, or blob data set 1255 of cloud storage framework 1240, or to data sets 1252 or data set 1254 of relational database frameworks 1250. Proxy layers 1228 can be used to access data 1262 or data 1264 of third party clouds 1260. Content data abstract layers (DALs) 1230 can be used to access content, where applicable. In this regard, there can be duplication or overlap of data sets across different types of storage, e.g., the same data might be represented as blob data and as structured data, e.g., SQL.

As supplemental services to the data, billing and discovery services 1270 can include online billing 1272 (e.g., MOCP) or discovery services 1274 (e.g., pinpoint) and authentication services 1280 can include credentials management 1282 (e.g., Live ID) or content authentication 1284, e.g., authenticated content services (ACS). Accounts services 1290 can include logging/audit services 1286 or account management 1288. Management and operations services 1292 can include an operations dashboard service 1294 and network operations service 1296, e.g., Gomez.

Figure 13:
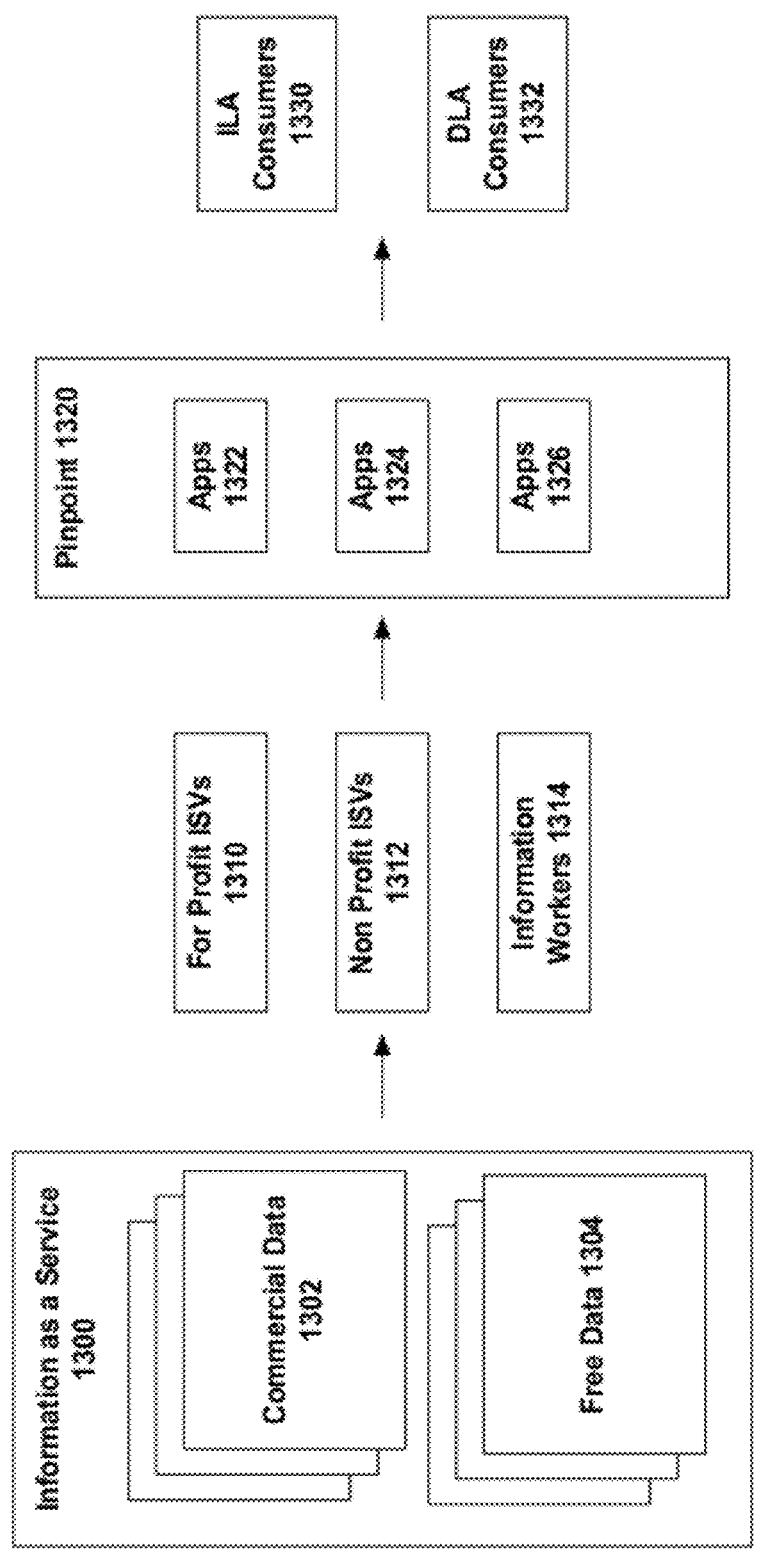
FIG. 13 is illustrative of exemplary consumption of data from an exemplary infrastructure for information provided as a service from any platform.

FIG. 13 is a block diagram illustrating an exemplary end to end flow from data to consumers of the data in accordance with one or more embodiments of the general infrastructure for enabling information as a service. For instance, information as a service 1300 can include commercial data 1302 and free data 1304, which can be of interest to various for profit developers 1310, nonprofit developers 1312 with non-profit motives and other information workers 1314 who are interested in consuming the data generally for productive goals. These entities can use discovery services 1320 to determine what applications 1322, 1324, . . . , 1326 may be of interest to them, and to ultimately transmit the data to ILA consumers 1330 and DLA consumers 1332 alike.

The Open Data Protocol

Those skilled in the art will appreciate that network interactions and information services can be practiced with a variety of computer system configurations and protocols. In this regard, one non-limiting implementation for querying and updating data that can be used in one or more embodiments described herein is the Open Data Protocol (OData).

OData is a web protocol for querying and updating data. OData applies web technologies such as HyperText Transfer Protocol (HTTP), Atom Publishing Protocol (AtomPub) and JavaScript Object Notation (JSON) to provide access to information from a variety of applications, services, and stores. For some general background, OData emerged organically based on the experiences implementing AtomPub clients and servers in a variety of products over the past several years. OData can be used to expose and access information from a variety of sources, including, but not limited to, relational databases, file systems, content management systems, and traditional web sites. OData has been released under the Open Specification Promise (OSP) to allow anyone to freely interoperate with OData implementations, in order to encourage growth of the ecosystem. Features of OData can be incorporated into other protocols as well to form hybrid protocols with similar functionality for querying and updating network data.

OData is consistent with the way the web works. In one aspect, OData uses universal resource identifiers (URIs) as a way to identify resources and uses an HTTP-centric protocol with a uniform interface for interacting with those resources, e.g., similar to the way that the Internet works. In one non-limiting aspect, OData builds on the conventions over HTTP popularized by AtomPub, which have simplified the process of sharing data, content and information across independently developed systems. OData defines additional conventions that implementations can optionally implement to support basic query and schema information to be exchanged. To simplify integration with HTML and JavaScript clients, OData defines an optional JSON representation of the protocol that complements the XML-based AtomPub format. As one can appreciate, additional implementation specific or other details regarding the OData protocol can be found at www.odata.org.

Exemplary Networked and Distributed Environments

One of ordinary skill in the art can appreciate that the various embodiments of methods and devices for an infrastructure for information as a service from any platform and related embodiments described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Figure 14:
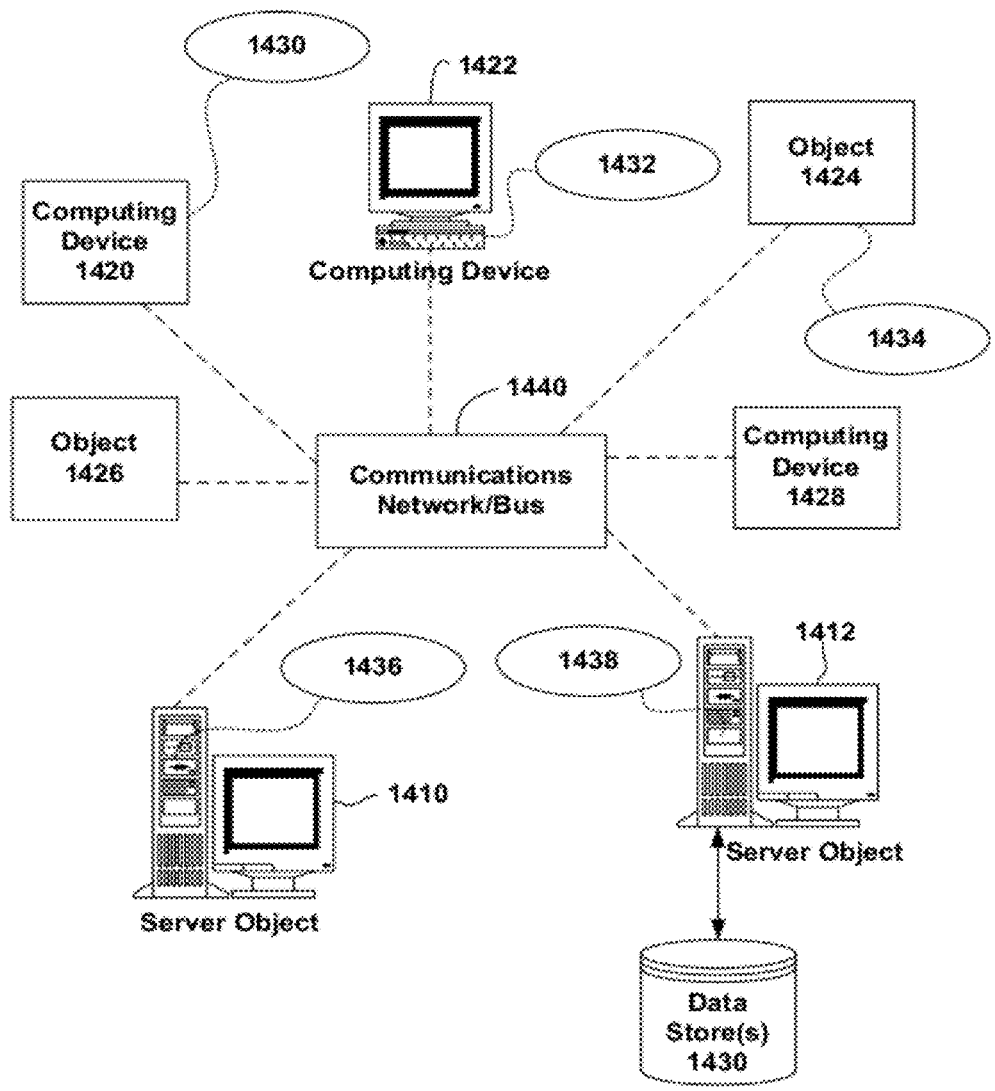
FIG. 14 is a block diagram representing exemplary non-limiting networked environments in which various embodiments described herein can be implemented.

FIG. 14 provides a non-limiting schematic diagram of an exemplary networked or distributed computing environment. The distributed computing environment comprises computing objects or devices 1410, 1412, etc. and computing objects or devices 1420, 1422, 1424, 1426, 1428, etc., which may include programs, methods, data stores, programmable logic, etc., as represented by applications 1430, 1432, 1434, 1436, 1438. It can be appreciated that computing objects or devices 1410, 1412, etc. and computing objects or devices 1420, 1422, 1424, 1426, 1428, etc. may comprise different devices, such as PDAs, audio/video devices, mobile phones, MP3 players, laptops, etc.

Each computing object or device 1410, 1412, etc. and computing objects or devices 1420, 1422, 1424, 1426, 1428, etc. can communicate with one or more other computing objects or devices 1410, 1412, etc. and computing objects or devices 1420, 1422, 1424, 1426, 1428, etc. by way of the communications network 1440, either directly or indirectly. Even though illustrated as a single element in FIG. 14, network 1440 may comprise other computing objects and computing devices that provide services to the system of FIG. 14, and/or may represent multiple interconnected networks, which are not shown. Each computing object or device 1410, 1412, etc. or 1420, 1422, 1424, 1426, 1428, etc. can also contain an application, such as applications 1430, 1432, 1434, 1436, 1438, that might make use of an API, or other object, software, firmware and/or hardware, suitable for communication with or implementation of an infrastructure for information as a service from any platform as provided in accordance with various embodiments.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the techniques as described in various embodiments.

Thus, a host of network topologies and network infrastructures, such as client/server, peer-to-peer, or hybrid architectures, can be utilized. In a client/server architecture, particularly a networked system, a client is usually a computer that accesses shared network resources provided by another computer, e.g., a server. In the illustration of FIG. 14, as a non-limiting example, computing objects or devices 1420, 1422, 1424, 1426, 1428, etc. can be thought of as clients and computing objects or devices 1410, 1412, etc. can be thought of as servers where computing objects or devices 1410, 1412, etc. provide data services, such as receiving data from computing objects or devices 1420, 1422, 1424, 1426, 1428, etc., storing of data, processing of data, transmitting data to computing objects or devices 1420, 1422, 1424, 1426, 1428, etc., although any computer can be considered a client, a server, or both, depending on the circumstances. Any of these computing devices may be processing data, or requesting services or tasks that may implicate an infrastructure for information as a service from any platform and related techniques as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the user profiling can be provided standalone, or distributed across multiple computing devices or objects.

In a network environment in which the communications network/bus 1440 is the Internet, for example, the computing objects or devices 1410, 1412, etc. can be Web servers with which the computing objects or devices 1420, 1422, 1424, 1426, 1428, etc. communicate via any of a number of known protocols, such as HTTP. As mentioned, computing objects or devices 1410, 1412, etc. may also serve as computing objects or devices 1420, 1422, 1424, 1426, 1428, etc., or vice versa, as may be characteristic of a distributed computing environment.

Exemplary Computing Device

As mentioned, various embodiments described herein apply to any device wherein it may be desirable to implement one or pieces of an infrastructure for information as a service from any platform. It is understood, therefore, that handheld, portable and other computing devices and computing objects of all kinds are contemplated for use in connection with the various embodiments described herein, i.e., anywhere that a device may provide some functionality in connection with an infrastructure for information as a service from any platform. Accordingly, the below general purpose remote computer described below in FIG. 15 is but one example, and the embodiments of the subject disclosure may be implemented with any client having network/bus interoperability and interaction.

Although not required, any of the embodiments can partly be implemented via an operating system, for use by a developer of services for a device or object, and/or included within application software that operates in connection with the operable component(s). Software may be described in the general context of computer-executable instructions, such as program modules, being executed by one or more computers, such as client workstations, servers or other devices. Those skilled in the art will appreciate that network interactions may be practiced with a variety of computer system configurations and protocols.

Figure 15:
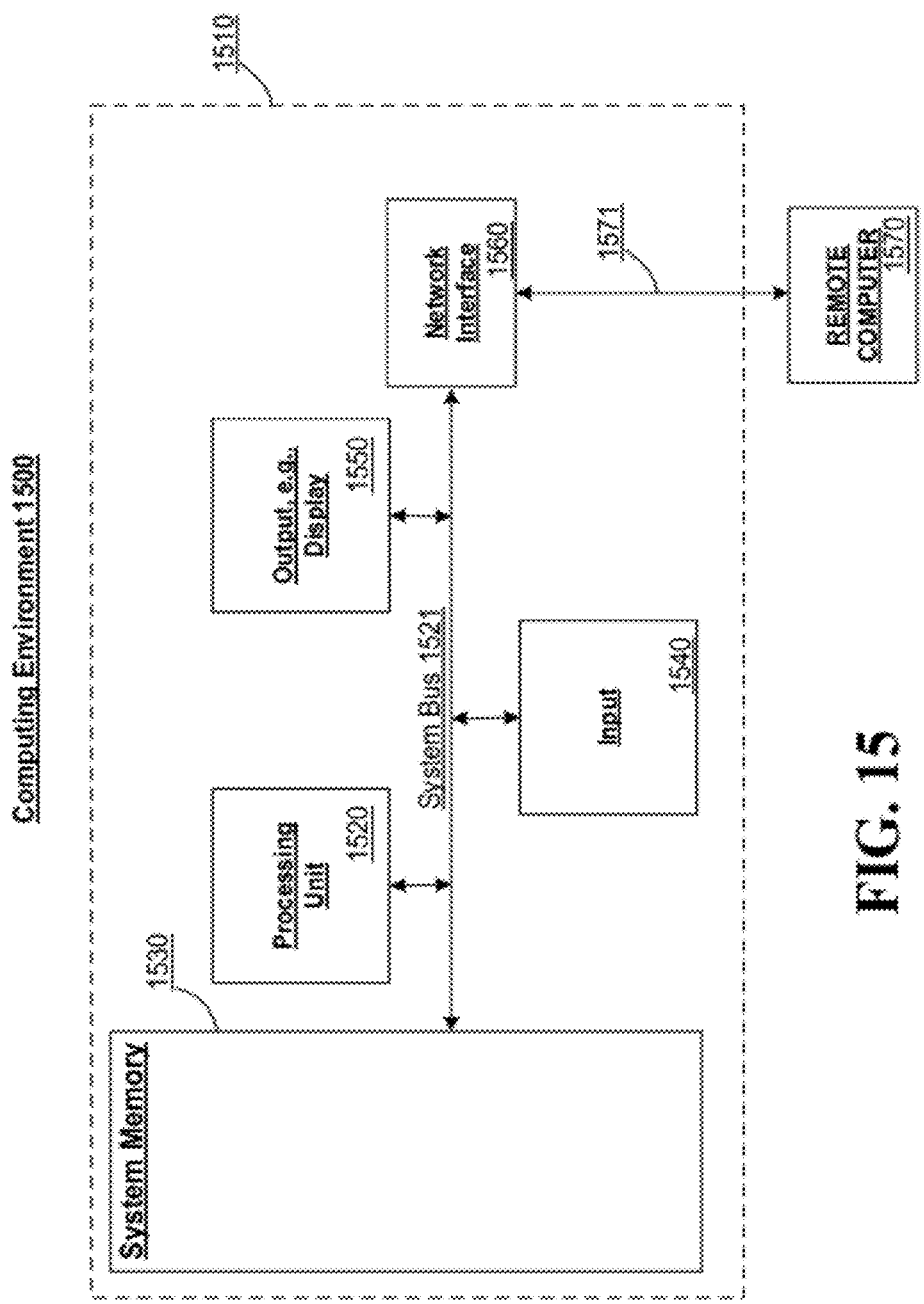
FIG. 15 is a block diagram representing an exemplary non-limiting computing system or operating environment in which one or more aspects of various embodiments described herein can be implemented.

FIG. 15 thus illustrates an example of a suitable computing system environment 1500 in which one or more of the embodiments may be implemented, although as made clear above, the computing system environment 1500 is only one example of a suitable computing environment and is not intended to suggest any limitation as to the scope of use or functionality of any of the embodiments. The computing environment 1500 is not to be interpreted as having any dependency or requirement relating to any one or combination of components illustrated in the exemplary operating environment 1500.

With reference to FIG. 15, an exemplary remote device for implementing one or more embodiments herein can include a general purpose computing device in the form of a handheld computer 1510. Components of handheld computer 1510 may include, but are not limited to, a processing unit 1520, a system memory 1530, and a system bus 1521 that couples various system components including the system memory to the processing unit 1520.

Computer 1510 typically includes a variety of computer readable media and can be any available media that can be accessed by computer 1510. The system memory 1530 may include computer storage media in the form of volatile and/or nonvolatile memory such as read only memory (ROM) and/or random access memory (RAM). By way of example, and not limitation, memory 1530 may also include an operating system, application programs, other program modules, and program data.

A user may enter commands and information into the computer 1510 through input devices 1540 A monitor or other type of display device is also connected to the system bus 1521 via an interface, such as output interface 1550. In addition to a monitor, computers may also include other peripheral output devices such as speakers and a printer, which may be connected through output interface 1550.

The computer 1510 may operate in a networked or distributed environment using logical connections to one or more other remote computers, such as remote computer 1570. The remote computer 1570 may be a personal computer, a server, a router, a network PC, a peer device or other common network node, or any other remote media consumption or transmission device, and may include any or all of the elements described above relative to the computer 1510. The logical connections depicted in FIG. 15 include a network 1571, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices, networks and advertising architectures, the underlying concepts may be applied to any network system and any computing device or system in which it is desirable to publish, build applications for or consume data in connection with interactions with a cloud or network service.

There are multiple ways of implementing one or more of the embodiments described herein, e.g., an appropriate API, tool kit, driver code, operating system, control, standalone or downloadable software object, etc. which enables applications and services to use the infrastructure for information as a service from any platform. Embodiments may be contemplated from the standpoint of an API (or other software object), as well as from a software or hardware object that facilitates provision of an infrastructure for information as a service from any platform in accordance with one or more of the described embodiments. Various implementations and embodiments described herein may have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter can be appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

While in some embodiments, a client side perspective is illustrated, it is to be understood for the avoidance of doubt that a corresponding server perspective exists, or vice versa. Similarly, where a method is practiced, a corresponding device can be provided having storage and at least one processor configured to practice that method via one or more components.

While the various embodiments have been described in connection with the preferred embodiments of the various figures, it is to be understood that other similar embodiments may be used or modifications and additions may be made to the described embodiment for performing the same function without deviating there from. Still further, one or more aspects of the above described embodiments may be implemented in or across a plurality of processing chips or devices, and storage may similarly be affected across a plurality of devices. Therefore, the present invention should not be limited to any single embodiment, but rather should be construed in breadth and scope in accordance with the appended claims.

What is claimed is:

1. A computer system, the computer system comprising:
   a processor;
   system memory coupled to the processor, the system memory storing instructions that are executable by the processor; and
   the processor executing the instructions stored in the system memory to:
      receive a request to consume data maintained at a service;
      access a portion of data output by the service in a service response, the portion of data in an arbitrary form, the arbitrary form used by the service;
      associate third party code with a transform assembly; the transform assembly comprises at least one application programming interface (API) according to a manifest based on a conceptual model (CSDL);
      use the transform assembly and the third party code to provide an enhanced data feature associated with the portion of data by transforming the portion of data in the arbitrary form into other data in a standardized format in the system memory so that data provided by the service managed like data from a relational store in a uniform manner, transforming the data including:
         identify one or more transformation functions previously selected by a content provider of the service, the one or more transformation functions matched to the arbitrary form by the content provider to transform data from the arbitrary form to the standardized format, the one or more transform functions selected, from among a plurality of offered transform functions, through a user interface based on input from the content provider, the one or more transform functions maintained in a local library or accessed from an external library; and
      apply the transform assembly, which calls the one or more transformation functions, to the portion of data to transform the portion of data from the arbitrary form to the other data in the standardized format, applying the one or more transform functions allowing the service to be substantially treated like the relational store; and
      provide the generated other data from the system memory in an outgoing response to the received request.

2. The computer system of claim 1, further comprising the processor executing the instructions to map the service onto a parameterized function.

3. The computer system of claim 1, further comprising the processor executing the instructions to:
   process the other portion of data in the standardized format to realize a relational store capability of the service, wherein processing includes performing at least one of a projection, an ordering, or a joining on a tabular result.

4. The computer system of claim 1, wherein the processor executing the instructions stored in the system memory to apply the transform assembly comprises the processor executing the instructions stored in the system memory to apply the one or more transformation functions to treat the service like the relational store with some degradation based on behavior of the service.

5. The computer system of claim 4, wherein the processor executing the instructions stored in the system memory to treat the service like the relational store with some degradation based on behavior of the service comprises the processor executing the instructions stored in the system memory to transform behavior of the service for compliance with information as a service.

6. The computer system of claim 1, further comprising the processor executing the third party code at runtime to provide a runtime service associated with the transform assembly.

7. The computer system of claim 1, further comprising the processor executing the third party code at load time to provide a load time service associated with the transform assembly.

8. The computer system of claim 1, further comprising the processor executing the third party code in conjunction with uploading the transform assembly at a runtime unit to provide an on-boarding time service associated with the transform assembly.

9. The computer system of claim 1, further comprising the processor executing the instructions to:
   receive a second request to consume second data maintained at a second different service;
   access a second portion of data output by the second service, the second portion of data in a second different arbitrary form, the second different arbitrary form used by the second service;
   generate second other data responsive to the second request by transforming the second portion of data from the second different arbitrary form into the second other data in the standardized format so that data from the second service can be managed along with data from the relational store in the uniform manner, transforming the data including:
      identify a second one or more transformation functions previously selected by a second different content provider, the second one or more transformation functions matched to the second arbitrary form by the second different content provider to transform data from the second arbitrary form to the standardized format, the second one or more transform functions selected, from among the plurality of offered transform functions, through a user interface based on input from the second different content provider; and apply the second one or more transform functions to the second portion of data to transform the second portion of data from the second different arbitrary form to the second other data in the standardized format, applying the second one or more transform functions allowing the second service to be substantially treated like the relational store; and provide the generated second other data in an additional outgoing response.

10. A processor implemented method for use at a computer system, the computer system including a processor and system memory, the processor implemented method implemented on the processor for transforming service behavior into behavior compliant with information as a service, the processor implemented method comprising:

displaying a user interface, using the processor, to a content provider, wherein the content provider is associated with consumable data managed by a service, the consumable data in an arbitrary form compatible with the behavior of the service;

receiving an input from the content provider via the user interface, using the processor, wherein the input identifies at least one transform function selected by the content provider, the at least one transform function for use in transforming data from the arbitrary form into other data in a standardized format so that data provided by the service can be managed along with data from a relational store in a uniform manner, the at least one transform selected, from among a plurality of available transforms, by the content provider, the at least one transform matched to the arbitrary form by the content provider, the at least one transform function maintained in a local library or accessed from an external library;

generating a transform assembly in the system memory for uploading to a runtime unit, the transform assembly including the at least one transform based on the received input, wherein the transform assembly along with associated third party code to provide an enhanced data feature for associated data by transforming data from the arbitrary form to other data in the standardized format allowing the service to be substantially treated like the relational store using at least one application programming interface (API) according to a manifest based on a conceptual model (CSDL), including:

accessing data in the arbitrary form; and apply the transform assembly, which calls the at least one transform function, to transform the data from the arbitrary form into the other data in the standardized format; and providing the transformed data from the system memory in an outgoing response.

11. The method of claim 10, wherein the transform assembly transforms the data from the arbitrary form into at least one of: a tabular result, a JavaScript Object Notation (JSON) result, an Atom Syndication Format (ATOM) result, an Really Simple Syndication (RSS) result, or an Extensible Markup Language (XML) result.

12. The method of claim 10, wherein generating a transform assembly comprises linking a first transform function with a second transform function.

13. The method of claim 12, wherein at least one of the first transform function or the second transform function are provided by an independent software vendor (ISV).

14. The method of claim 10, wherein receiving an input from the content provider comprises receiving a codeless input from the content provider, and wherein generating a transform assembly comprises executing at least one application programming interface (API) according to a manifest based on a conceptual model (CSDL).

15. The method of claim 10, wherein generating a transform assembly comprises binding the at least one transform function to a graphical representation of transformed data.

16. At a computer system, the computer system including a processor and system memory, a method for transforming web service behavior for compliance with information as a service, the method comprising the processor:

receiving a request to consume data maintained at a service;

accessing a portion of data output by the web service, the portion of data in an arbitrary form, the arbitrary form used by the web service;

associating third party code with a transformation assembly, the transform assembly comprises at least one application programming interface (API) according to a manifest based on a conceptual model (CSDL);

use the transform assembly and the third party to provide an enhanced feature associated with the portion of data by transforming the portion of data in the arbitrary form into the other data in a standardized format in the system memory so that data from the service managed along with data from a relational store in a uniform manner, including:

identifying an one or more transformation functions previously selected by a content provider of the web service, the one or more transformation functions matched to the arbitrary form by the content provider to transform data from the arbitrary form to the standardized format, the one or more transform functions selected, from among a plurality of offered transform functions, based on input from the content provider, the one or more transform functions maintained in a local library or accessed from an external library; and applying the transform function, which calls the one or more transformation functions, to the portion of data to transform the portion of data from the arbitrary form to the other data in the standardized format, applying the one or more transform functions allowing the service to be substantially treated like the relational store; and providing the generated other data from the system memory in an outgoing response to the received request.

* * * * *